(No Model.) 2 Sheets—Sheet 1.

J. FANNEN.
WAGON WHEEL AND AXLE.

No. 561,546. Patented June 2, 1896.

Witnesses:
J. M. Fowler Jr.
R. E. Rabbitt.

Inventor
J. Fannen,
By John S. Duffie
Attorney.

(No Model.) 2 Sheets—Sheet 2.
J. FANNEN.
WAGON WHEEL AND AXLE.
No. 561,546. Patented June 2, 1896.
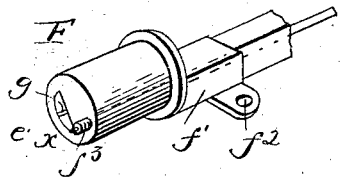
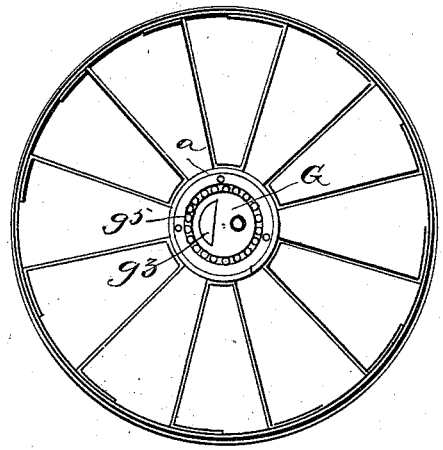
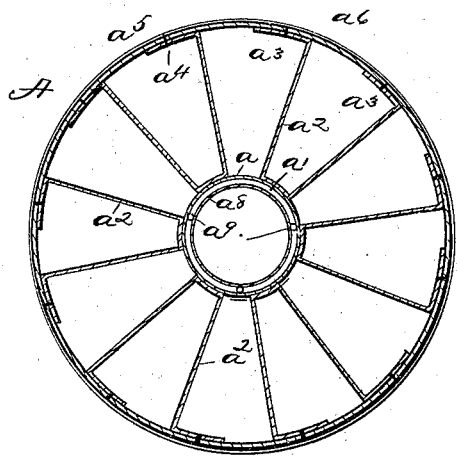
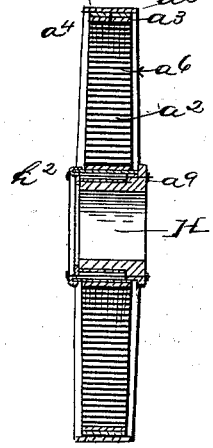
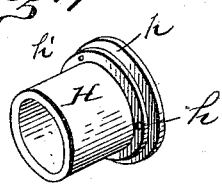
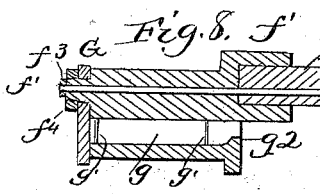
Witnesses:
J. M. Fowler Jr.
R. E. Rabbitt.
Inventor
J. Fannen
By John S. Duffie
Attorney.

UNITED STATES PATENT OFFICE.

JAMES FANNEN, OF BUCKNER, ARKANSAS, ASSIGNOR OF ONE HALF TO OTHO A. WARREN, OF SAME PLACE.

WAGON WHEEL AND AXLE.

SPECIFICATION forming part of Letters Patent No. 561,546, dated June 2, 1896.

Application filed September 20, 1895. Serial No. 563,139. (No model.)

*To all whom it may concern:*

Be it known that I, JAMES FANNEN, a citizen of the United States, residing at Buckner, in the county of Columbia and State of Arkansas, have invented certain new and useful Improvements in Wagon Boxes, Hubs, and Wheels; and I do hereby declare the following to be full, clear, and exact description of the invention, such as will enable others skilled in the art to which it appertains to make and use the same.

My invention is a combination of a new axle, spindle, hub, and wheel for wagons and other vehicles.

Figure 1:
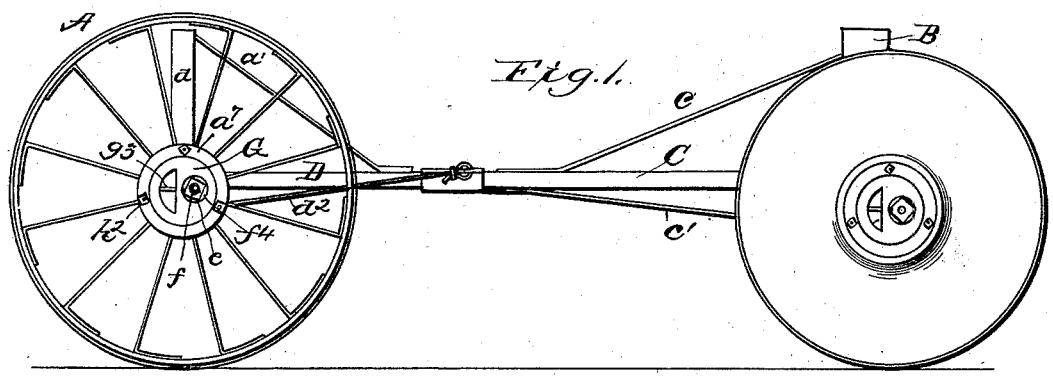
Figure 2:
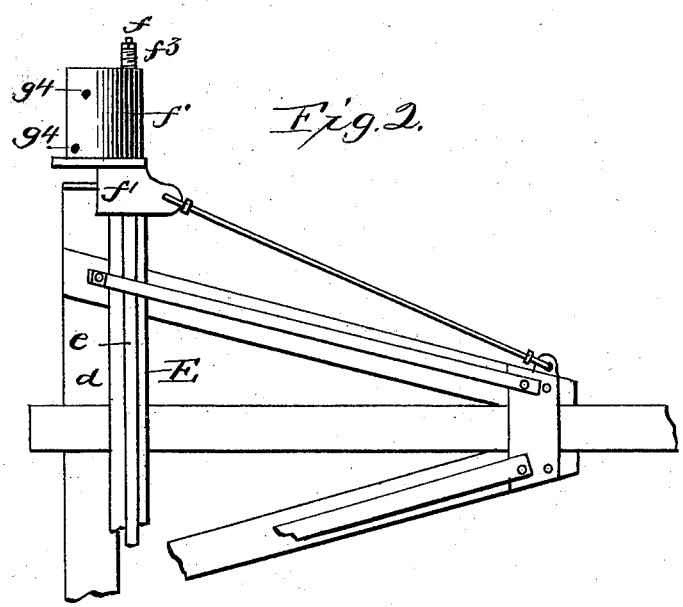

In the accompanying drawings, Figure 1 is an elevation of a wagon with my invention attached thereto. Fig. 2 is a detail view, being a bottom plan view of a part of the rear running-gear of a wagon, also showing a bottom view of the spindle. Fig. 3 is a perspective view of the spindle and part of the axle. Fig. 4 is an elevation of the wheel. Fig. 5 is an edge vertical sectional view of the wheel. Fig. 6 is a cross vertical sectional view of the wheel. Fig. 7 is a perspective view of the thimble. Fig. 8 is a sectional view of the spindle.

My wagon is designed to use several kinds of wheels, each wheel, however, having substantially the same hub; but in this specification I confine myself to the rear wheel A.

My wagon is constructed substantially as an ordinary log-wagon, consisting of the front gearing and bolster B, coupling-tongue C, upper braces $c$, and lower braces $c'$, rear hounds D, bolster $d$, upper braces $d'$, and lower braces $d^2$.

The axle E consists of a piece of wood having running along its bottom in a groove a steel rod $e$, which passes along a groove in the axle through the spindle F and through a threaded projection $f^3$ on the end of said spindle. Said axle may be made of hollow sheet-iron or other suitable material. Said spindle (see Fig. 3) has its inner ends $f'$ squared with a perforated projection $f^2$. Said squared parts are hollow to receive the ends of the axle E and rod $e$. Said spindle has on its outer end a projection $f^3$, on which is screwed a nut $f^4$ to hold the washer G in place. The rod $e$ does not pass through the center of the spindle, but through the front half of the same and through the threaded projection $f^3$.

In the other or rear half of the spindle is a longitudinal half-moon-shaped opening $g$, in which are strengthening-braces $g'$. The wall of said opening $g$ turns slightly up at its rear end, forming a dam $g^2$ to keep the oil from running out of that end of the opening. (See Fig. 8.) The half-moon-shaped opening $g^3$ of the washer G (see Figs. 2 and 3) is smaller than the opening $g$ in the spindle, and therefore forms a dam at that end of the opening. At the bottom of said opening $g$ are perforations $g^4$, (see Fig. 8,) through which the oil escapes to lubricate the rollers $g^5$. (See Fig. 4.)

My wheel A is constructed as follows: I first make a band $a$ of suitable metal and of sufficient width, and to said band at intervals I secure by rivets $a'$ V-shaped sheets of metal $a^2$, each end of which is turned to the left, forming feet $a^3$. When a sufficient number of these V-shaped sheets have been secured to the band, I secure to said feet, by means of bolts or rivets $a^4$, a band $a^5$, and over this band $a^5$ is secured an additional band or tire $a^6$. The front end of said band $a$ is provided with a perforated flange $a^7$, and to the inner periphery of said flange is secured an inner band $a^8$ not quite so large as the band $a$, leaving room for the bolts $a^9$ to pass between said bands, and the space between said two bands is filled with any suitable material. Said hub of said wheel is bushed with a thimble H, provided with a double flange $h$, having perforations $h'$, through which the bolts $a^9$ pass. Said bolts are provided with taps $h^2$, (see Fig. 1,) which secure said thimble in place.

It will be observed by reference to the drawings that the bolster $d$ is in rear of the bearing-point of the axle E. Bolster B is also in rear of the front axle. It will also be observed that thimble H is put in through the rear part of the hub of the wheel, and, as above stated, is secured in place by means of the bolts $a^9$ and nuts $h^2$, so that should said thimble become worn or broken it may be replaced by a new one.

In putting the invention together, as described, the axle E is made the proper length and grooved. The rod $e$ is then put into the groove. Then said rod $e$ is passed through the perforation in the spindle, through the threaded projection $f^3$, and secured to the nut $f'$.

The wheel is then put on. Then the washer G is put in place, and held in place by means of a nut $f^4$, which screws onto the projection $f^3$. The oil is put in through the opening $g^3$ of the washer G, and is kept from running out of the rear end of said opening by the dam $g^2$ and out of the front end by the washer G, the opening of which being a little smaller than the opening $g$ of the spindle.

Having described my invention, what I claim as new, and desire to secure by Letters Patent, is—

1. In a log-wagon, substantially as shown, the combination of the running-gear provided with the grooved axle E, fitting in the hollow part $f'$ of the spindle F; the spindle F, having the hollow square part $f'$, and the cylindrical part, provided with a perforation for the rod $e$, and a threaded perforated projection $f^3$, an opening or perforated oil-tank $g$, and dam $g^2$; rod $e$, passing along the groove of the axle E, through the perforation in the spindle F, and through the threaded perforated projection $f^3$; being secured in place by a nut $f^4$; wheel A, adapted to work on spindle F, with or without the rollers $g^5$; washer G, having the half-moon-shaped opening $g^3$, and fitting over the threaded perforated projection $f^3$; and nut $f^4$, securing said washer in place, substantially as shown and described and for the purposes set forth.

2. In combination with a wagon as shown, the spindle F, provided with the hollow square part $f'$, cylindrical part, provided with a perforation; threaded perforated projection $f^3$; perforated oil-tank $g$, dam $g^2$, washer G, and means for holding the same in place, substantially as shown and described and for the purposes set forth.

3. In combination with a wagon as shown, the spindle F, provided with the hollow square part $f'$, cylindrical part, provided with a perforation; threaded perforated projection $f^3$; perforated oil-tank $g$, strengthening-rods $g'$, dam $g^2$, washer G, and means for holding the same in place, substantially as shown and described and for the purposes set forth.

4. In combination with a wagon as shown, having the spindle F, the wheel A, consisting of the bands $a$ and $a^3$, perforated flange $a^7$, V-shaped sheets $a^2$, and secured on the outer ends thereof band $a^5$, and over said band $a^5$, the tire $a^6$, the hub of said wheel being provided with a thimble H, adapted to work on spindle F, with or without the rollers $g^5$, substantially as shown and described and for the purposes set forth.

In testimony whereof I affix my signature in presence of two witnesses.

JAMES FANNEN.

Witnesses:
JAMES H. LANDES,
OTHO A. WARREN.